Patented Feb. 3, 1931

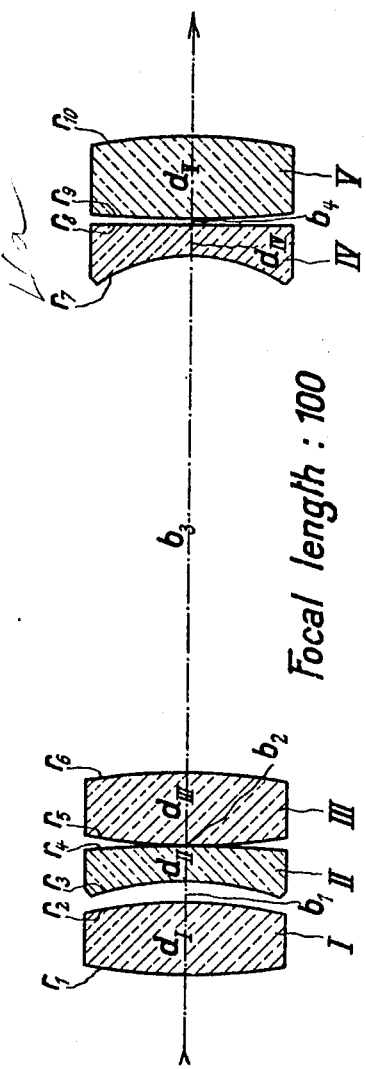

1,791,276

UNITED STATES PATENT OFFICE

ALBERT KÖNIG, OF JENA, GERMANY, ASSIGNOR TO THE FIRM: CARL ZEISS, OF JENA, GERMANY

MICROSCOPE OBJECTIVE

Application filed February 8, 1929, Serial No. 338,452, and in Germany February 15, 1928.

The invention relates to microscope objectives for subjective observation and for projection purposes with and without eyepiece, where a working distance which is specially long in relation to the focal length is desired. Such objective is obtained by composing a positive and a negative partial system, when the objective is applied in such a way that the positive partial system faces the object. The purpose of application of such objectives requires a correction as complete as possible of the image forming defects in the axis, with regard to the spherical aberrations and their chromatic difference. In order to come up to this requirement it is necessary to chromatically correct for itself each of the partial systems and, at the same time, to choose such kinds of glass for the single members that the difference of their ABBE figures $v$ in each partial system and at least between two single members is greater than 15, whereby the (front) partial system facing the object must be spherically undercorrected. In order to further obtain a satisfactory elimination of the image curvature, of the astigmatism and the distortion, it has proved to be of advantage to give the objective such a form that the surface having the strongest curvature, of one of the negative members belonging to the back partial system faces the object. A further improvement can be attained in that way that the surface having the strongest curvature, also of one of the negative members belonging to the front partial system faces the object.

The drawing represents in a longitudinal section an example of a microscope objective corresponding to the invention.

The objective shown in the drawing consists of a front partial system comprising a collective lens I, a dispersive lens II, and a collective lens III, and of a back partial system comprising a dispersive lens IV and a collective lens V. The values given in the following tables for the radii $r$, the distance $b$, and the thicknesses $d$ refer to a focal length of the system of 100 units.

| Radii | Thicknesses and distances |
|---|---|
| $r_1 = +118.10$ | $d_I = 14.0$ |
| $r_2 = -87.10$ | $b_1 = 4.0$ |
| $r_3 = -59.28$ | $d_{II} = 7.0$ |
| $r_4 = -387.00$ | $b_2 = 0$ |
| $r_5 = +113.00$ | $d_{III} = 14.0$ |
| $r_6 = -120.10$ | $b_3 = 99.5$ |
| $r_7 = -33.19$ | $d_{IV} = 6.0$ |
| $r_8 = \pm \infty$ | $b_4 = 1.0$ |
| $r_9 = +258.00$ | $d_V = 16.0$ |
| $r_{10} = -101.00$ | |

Kinds of glass

| | I | II | III | IV | V |
|---|---|---|---|---|---|
| $n_D$ | 1.5163 | 1.7174 | 1.6073 | 1.6073 | 1.6200 |
| $v$ | 64.0 | 29.5 | 59.5 | 59.5 | 36.3 |

I claim:

1. A microscope objective for long working distance consisting of a front positive partial system and a back negative partial system, both partial systems being in themselves chromatically corrected, the difference of the ABBE figures $v$ of at least two of the kinds of glass used in each of both partial systems being greater than 15, the front partial system being spherically undercorrected and comprising two positive lenses and a negative lens, of which three lenses at least two have an air space between them, the back partial system being a single negative lens with a single positive lens behind, the said two negative lenses having the stronger curvature on their front surface.

2. A microscope objective for long working distance consisting of a front positive partial system and a back negative partial system, both partial systems being in themselves chromatically corrected, the difference of the ABBE figures $v$ of at least two of the kinds of glass used in each of both partial systems being greater than 15, the front partial system being spherically undercorrected and comprising two single positive lenses having a single negative lens between them, the back partial system being a single negative lens with a single positive lens behind, the said two negative lenses having the stronger curvature on their front surface.

3. A microscope objective for long working distance consisting of a front positive partial system comprising two positive lenses and a negative lens, of which three lenses at least two have an air space between them, the said negative lens turning its stronger curved surface to the object-space, and of a back negative partial system consisting of a single negative lens which turns its stronger curved surface to the object-space and has behind a single positive lens.

4. A microscope objective for long working distance consisting of a front positive partial system comprising two single positive lenses having between them a single negative lens which turns its stronger curved surface to the object-space, and of a back negative partial system consisting of a single negative lens which turns its stronger curved surface to the object-space and has behind a single positive lens.

5. A microscope objective for long working distance consisting of a front positive partial system, composed of two single bi-convex lenses having between them a single negative lens which turns its stronger curved surface to the object-space, and of a back negative partial system, consisting of a single negative lens which turns its stronger curved surface to the object-space and has behind a single bi-convex lens.

ALBERT KÖNIG.